United States Patent [19]

Michoux

[11] Patent Number: 4,903,800
[45] Date of Patent: Feb. 27, 1990

[54] SELF-ADJUSTING DRUM BRAKE

[75] Inventor: Eric Michoux, Villiers Sur Marne, France

[73] Assignee: Bendix France, Drancy, France

[21] Appl. No.: 277,613

[22] Filed: Nov. 29, 1988

[30] Foreign Application Priority Data

Dec. 1, 1987 [FR] France .................. 87 16617

[51] Int. Cl.⁴ .................................. F16D 65/56
[52] U.S. Cl. .................. 188/79.54; 188/79.62; 188/196 BA; 192/111 A
[58] Field of Search ............. 188/79.52, 79.54, 79.55, 188/79.56, 79.62, 106 A, 106 F, 196 BA; 196/111 A

[56] References Cited

U.S. PATENT DOCUMENTS

| | | | |
|---|---|---|---|
| 4,222,467 | 9/1980 | Kluger et al. | 188/79.5 |
| 4,502,573 | 3/1985 | Carré188 | 79.5/ |
| 4,533,024 | 8/1985 | Roth | 188/196 BA X |
| 4,589,527 | 5/1986 | Danne et al. | 188/79.54 |
| 4,706,783 | 11/1987 | Roth et al. | 188/79.52 |

FOREIGN PATENT DOCUMENTS 0061961 10/1982 European Pat. Off. .
2507271 12/1982 France .
86/101866 12/1985 World Int. Prop. O. .

Primary Examiner—George E. A. Halvosa

[57] ABSTRACT

In a drum brake provided with an automatic adjustment device (40c, 40d) effecting the elongation of a spacer interposed between the shoes (12, 14) in the proximity of the brake motor (22), a device (46, 34) makes it possible to neutralize the adjustment device when heavy braking is applied. This device (46, 34) comprises a lever (46, 34) pivoted on one shoe (12, 14) and provided with a projection against which the brake motor bears. A spring (50, 42) normally holds the lever in a position of rest on the shoe supporting it, and the spacer bears against the lever. On heavy braking, the lever pivots, thus neutralizing the adjustment device. The lever can in particular be the hand brake lever (34).

4 Claims, 4 Drawing Sheets

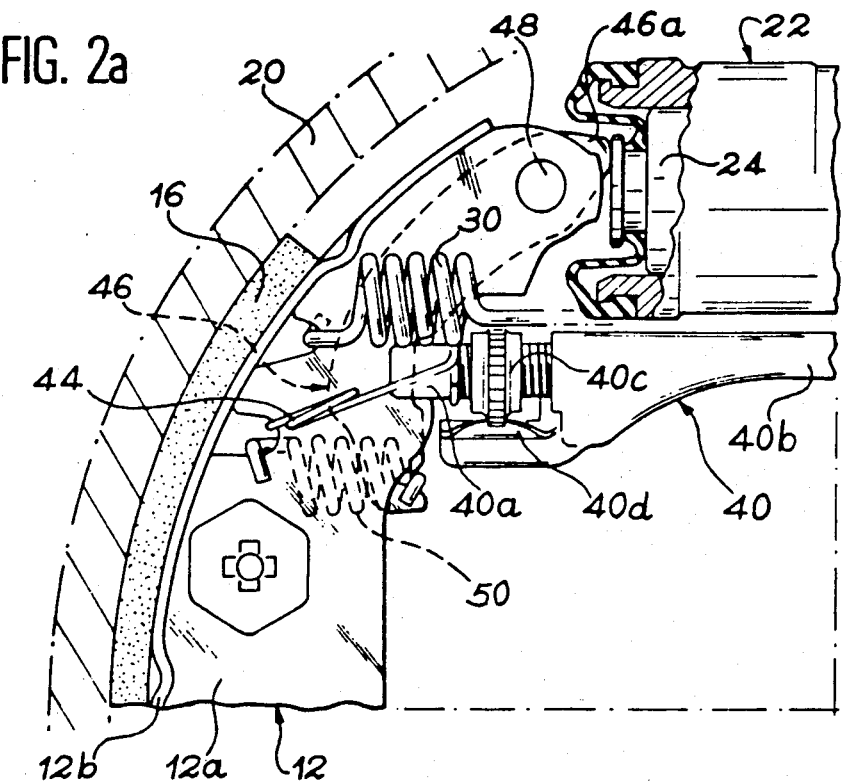
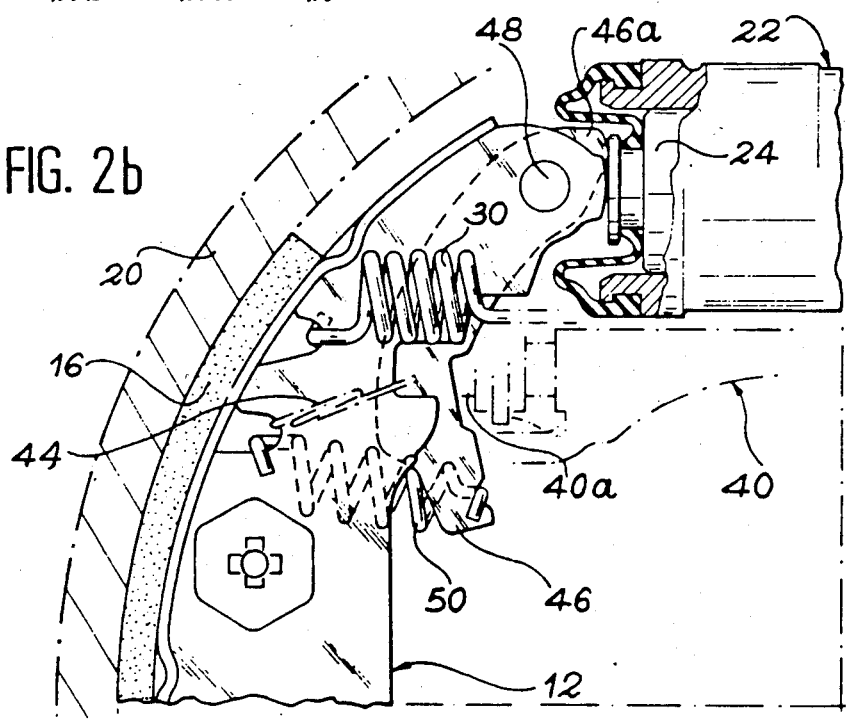

SELF-ADJUSTING DRUM BRAKE

DESCRIPTION

The invention relates to a drum brake equipped with an automatic adjustment device taking into account any wear of the brake friction members, in order that the stroke of the brake motor will remain practically unchanged despite such wear. A brake of this kind may be used indiscriminately on a private vehicle or a heavy goods vehicle.

More precisely, the invention relates to a drum brake of the kind described in document U.S. Pat. No. 4,222,467. This brake contains a support plate on which two brake shoes carrying friction linings are slidably mounted. These linings are adapted to be brought into contact with a rotating drum by means of a brake motor interposed between two adjacent ends of the shoes. A spacer of variable length is interposed between the shoes in the proximity of the brake motor in order to define a minimum spacing distance between the ends of the shoes. A spring applies the shoes against the spacer when the brake motor is not operated.

In this drum brake the automatic adjustment device controls the elongation of the spacer. For this purpose the spacer comprises a screw and nut arrangement in which the screw is fastened to a gear. When the operation of the brake motor has the effect of moving the ends of the shoes apart to an extent exceeding a predetermined operating clearance, a pawl engaging with the gear brings about the rotation of the latter in the direction corresponding to the elongation of the spacer.

In drum brakes equipped with an automatic adjustment device and not provided with some special arrangement, adjustment is effected as soon as the ends of the shoes adjacent to the motor become spaced apart to an extent exceeding the predetermined operating clearance, whatever the operating conditions of the brake may be.

However, powerful braking entails mechanical deformation of the shoes and drum, with the consequence that the self-adjusting device is operated inappropriately. This results in overadjustment leading to residual torque which causes heating of the brake and premature wear of the friction linings.

In document EP-A-No. 0 061 961 a solution to this problem was proposed in the case of a drum brake in which the self-adjusting device comprises an adjusting lever mounted for pivoting on one of the shoes, with its end bearing against a toothed sector cooperating with a pawl mounted on the same shoe. Adjustment is effected through the pivoting of the adjusting lever through the action of a finger formed on the spacer. In this document neutralization of the adjustment under pressure is achieved through the action of the brake motor on this adjusting lever, in such a manner that it can no longer pivot when braking pressure becomes excessive.

Although the solution described in document EP-A-No. 0 061 961 to the problem of inappropriate adjustment of drum brakes in the event of harsh braking is satisfactory, it can be applied only to brakes in which the automatic adjustment device comprises an adjusting lever and a pawl which are pivotally mounted on one of the shoes. In particular, this solution cannot be applied to drum brakes in which the automatic adjustment device directly controls the elongation of the spacer, as is illustrated in particular by U.S. Pat. No. 4,222,467.

The invention relates precisely to a drum brake equipped with an automatic adjustment device directly controlling the elongation of the spacer, this brake being provided with means making it possible to neutralize the automatic adjustment device in the event of harsh braking, that is to say when the pressure applied to the shoes by the brake motor exceeds a predetermined limit value.

According to the invention this result is obtained with the aid of a self-adjusting drum brake comprising a support plate on which are slidably mounted two brake shoes carrying friction members adapted to be brought into contact with a rotating drum by a brake motor interposed between two adjacent ends of the shoes, a spacer of variable length interposed between the shoes in the proximity of the brake motor, automatic adjustment means effecting the elongation of the spacer when the operation of the motor moves said ends of the shoes apart to an extent exceeding a predetermined operating clearance, and first resilient means urging the shoes against which the brake motor and the spacer normally bear through the action of said first resilient means, second resilient means bearing against the first shoe to apply to the lever a force tending to hold the latter in abutment against the first shoe, the moment of this force in relation to the pivot pin of the lever being opposite to the moment of the force exerted on the lever by the brake motor and determining a limit value of said last-mentioned moment, beyond which value the operation of the brake motor effects the pivoting of the lever towards the other shoe, thereby neutralizing the automatic adjustment means.

In the improved drum brake thus defined the brake motor and the spacer bear against one of the shoes with the aid of a lever mounted for pivoting on said shoe. The lever is normally locked, by means of a spring, on the shoe carrying it. When the moment of the force exerted by the brake motor on the lever, relative to its pivot axis, exceeds the moment exerted in the opposite direction by the spring, the lever pivots on the shoe. The lever is then held bearing against the spacer in such a manner that no increase of the length of the latter occurs.

The pivot axis of the lever on the first shoe is situated in a plane containing the axis of the brake motor, the latter bearing against a projection formed on the lever and situated on the other side of said plane, relative to the spacer.

In a first embodiment of the invention the brake motor and the second resilient means bear against the opposite ends of the lever, the latter being pivoted on the first shoe at a point close to the brake motor.

In another embodiment of the invention the pivoting lever is a hand brake lever pivoted on the first shoe at a point close to the brake motor, the second resilient means being interposed between the spacer and the first shoe in order to hold the spacer permanently in abutment against the hand brake lever.

Two embodiments of the invention will now be described, as non-limitative examples, with reference to the accompanying drawings, in which:

FIGS. 2a and 2b are plan views showing on a larger scale the top end of the brake shoe shown on the left in FIG. 1, in accordance with a first embodiment of the invention, the different components of the brake being shown respectively in the position which they occupy during normal braking in FIG. 2a, and in the position which they occupy during heavy braking in FIG. 2b;

Figure 3:
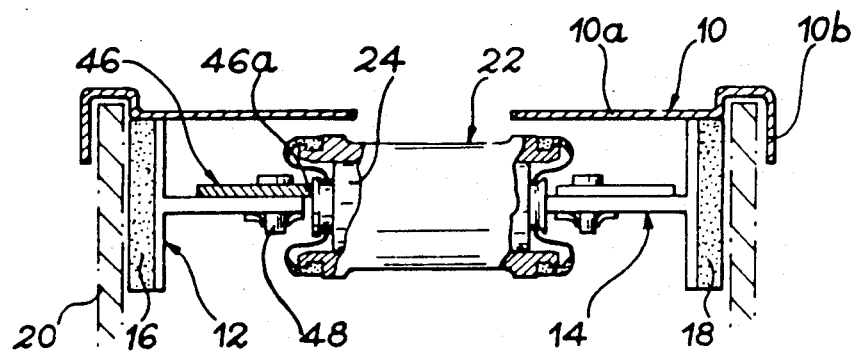
FIG. 3 is a view in section on the line III—III in FIG. 1 in the case of the embodiment shown in FIGS. 2a and 2b.
Figure 5:
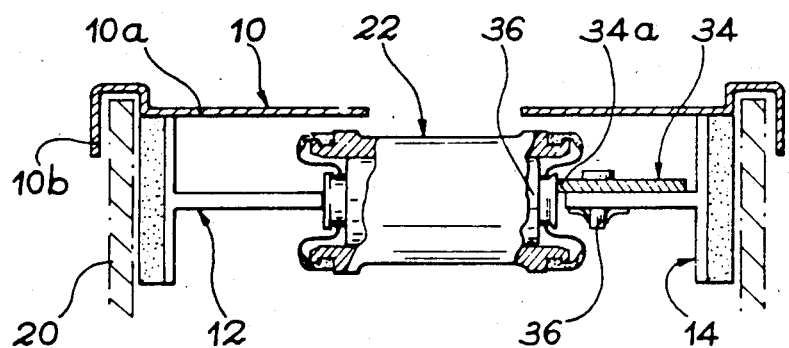
Figure 4A:
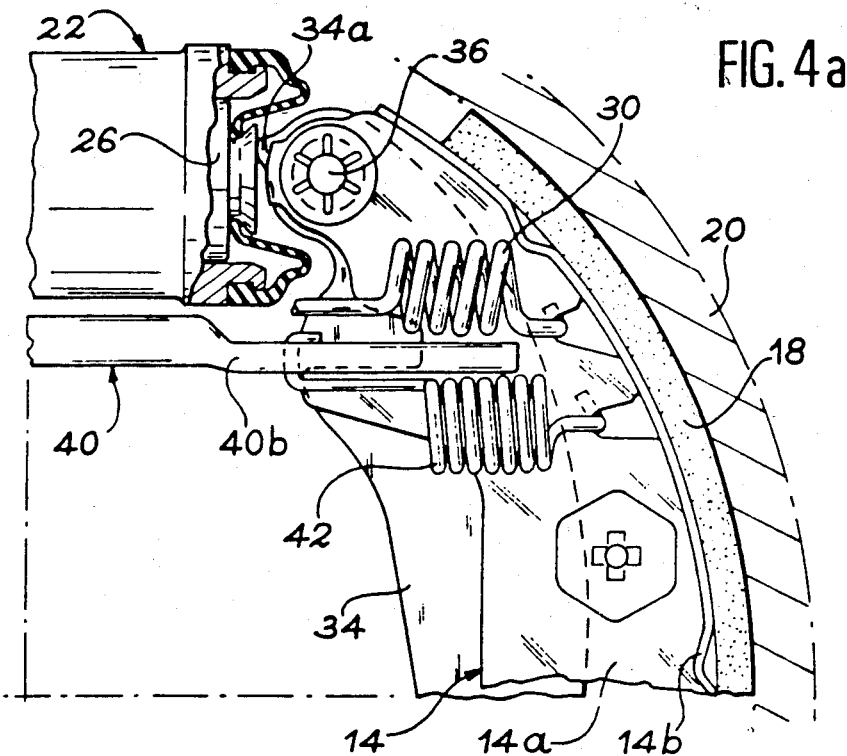
Figure 4B:
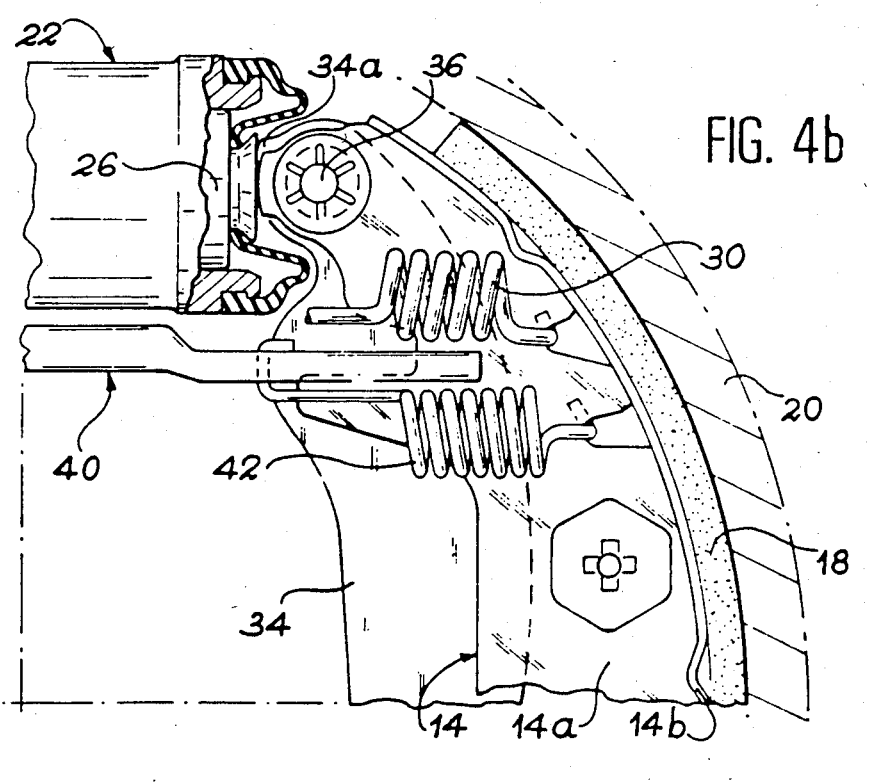

FIGS. 4a and 4b are plan views, on a larger scale comparable with FIGS. 2a and 2b, showing the different components of the brake in accordance with a second embodiment of the invention, respectively in the case of normal braking and in the case of heavy braking, and FIG. 5 is a view in section comparable with FIG. 3 in the case of the embodiment shown in FIGS. 4a and 4b.

Figure 1:
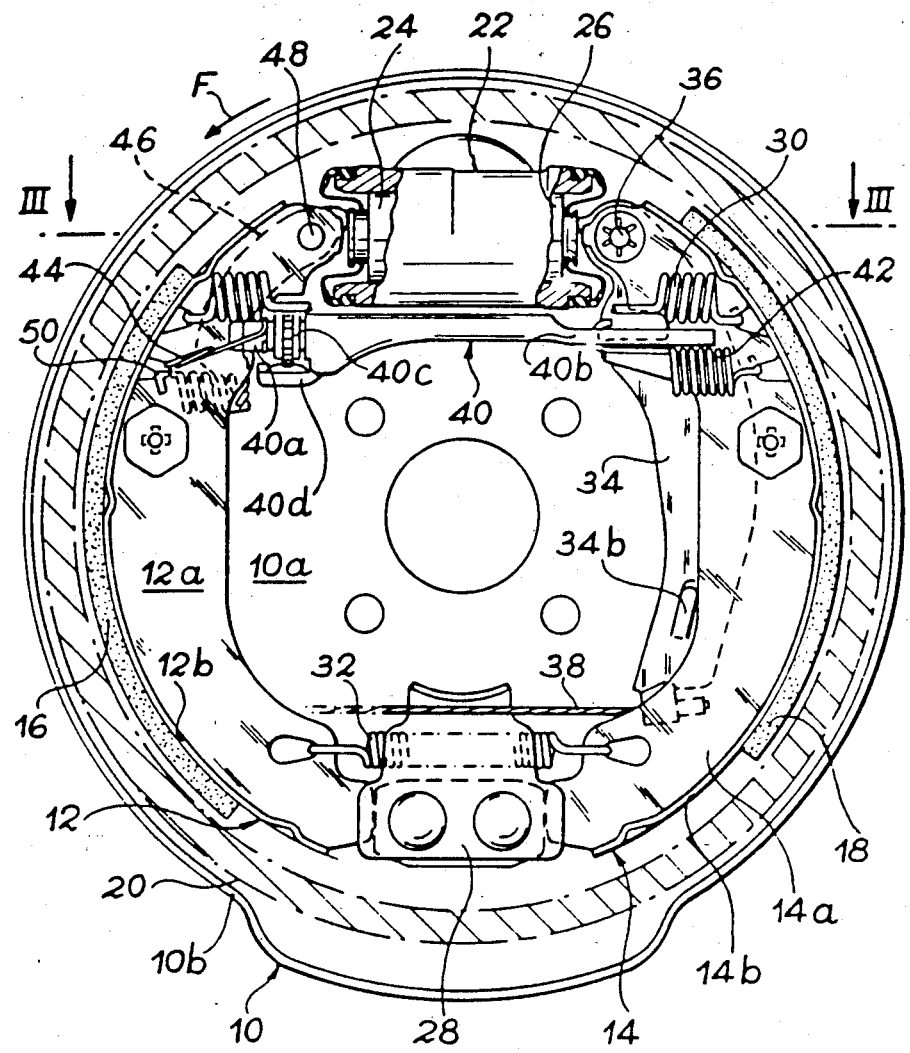
FIG. 1 is a plan view in which the left-hand and right-hand halves illustrate two different forms of construction of a drum brake according to the invention.

The drum brake shown in FIG. 1 comprises a support plate 10 consisting of an approximately plane disc 10a extended on its periphery by a circular collar 10b. This plate 10 is intended to be fastened to a fixed part of the vehicle, such as an axle flange.

Two brake shoes 12 and 14 are slidably supported by the disc 10a of the support plate with the aid of the customary mechanisms (not shown). In known manner each of the shoes 12 and 14 comprises an approximately planar web 12a, 14a on which is fixed a rim 12b, 14b having the shape of an arc of a circle and carrying on its outer face friction linings 16 and 18 respectively.

The shoes 12 and 14 are placed on the support plate 10 in such a manner that the outer envelopes of the linings 16 and 18 are situated on one and the same circle whose axis coincides with the axis of the support plate 10. The linings 16 and 18 can thus come into contact with the inside surface of a brake drum 20 covering the two shoes and shown in dot-dash lines in FIG. 1. The drum 20 is mounted concentrically inside the collar 10b and is fixed to a rotating part, such as a vehicle wheel.

A hydraulically operated brake motor 22 is fixed on the disc 10a of the support plate, between two first adjacent ends of the shoes 12 and 14. This brake motor 22 is provided with two pistons 24 and 26, which work in opposition in such a manner as to exert a thrust on the corresponding end of the web 13a, 14a of each of the shoes when the brake motor is operated.

An anchorage block 28, likewise fixed on the disc of the support plate, is disposed between the other two adacent ends of the shoes 12 and 14, in such a manner that the corresponding ends of the webs 12a and 14a of these shoes normally bear against said block.

A tension spring 30 is interposed between the ends of the brake shoe webs between which the brake motor 22 is disposed, in the immediate proximity of the latter, in order to bring said ends towards one another when the motor is not operated. In comparable manner the other two ends of the shoes 12 and 14 are held bearing against the anchorage block 28 by means of a tension spring 32 interposed between the corresponding ends of the brake shoe webs, in the immediate proximity of said block.

Assuming that the brake drum 20 rotates in the direction of the arrow F in FIG. 1 when the vehicle is moving forwards, the shoes 12 and 14 can be distinguished by the fact that the shoe 12 bears against the anchorage block 28 when it is in frictional contact with the drum while the shoe 14 bears against the piston 26 of the brake motor 22 under the same conditions. In order to take this difference into account, the shoes 12 and 14 are called respectively the "shoe in compression" and "shoe in tension".

A hand brake lever 34 is pivotally mounted by one of its ends on, for example, that end of the web of the shoe 14 in tension which is adjacent to the brake motor 22, with the aid of a pin 36. The geometrical axis of said pin 36 is situated in the same plane as the axis of the brake motor 22 and is directed perpendicularly to the last-mentioned axis. The end of a manual control cable 38 is fastened to the other end of the hand brake lever 34.

The brake drum illustrated in FIG. 1 is also provided with a spacer 40 disposed between the shoes 12 and 14 in the proximity of the brake motor 22, approximately parallel to the axis of the latter.

The spacer 40 is variable in length and is equipped with automatic adjustment means enabling its length to be increased in proportion to the wear of the friction linings 16 and 18. To this end the spacer 40 has two end portions 40a and 40b, in which are formed respectively a cutout receiving the web of the shoe 12 and and a cutout receiving the web of the shoe 14 and the hand brake lever 34.

Steps formed on the inner edge of the web of each of the shoes 12 and 14, at the site of the spacer 40, enable the latter to be held in position.

The ends of a tension spring 42 are attached respectively to the web of the shoe 14 in tension and to the end portion 40b, in such a manner as to obtain permanent contact between the hand brake lever 34 and the bottom of the corresponding cutout formed in the portion 40b. This spring 42 thus indirectly applies a pressed-out portion 34b of the hand brake lever against the inside edge of the web of the shoe 14 supporting said lever.

In comparable manner, the portion 40a is urged towards the web of the shoe 12 by a tension spring 44 whose ends bear respectively against the web of the shoe 12 and against the portion 40a.

The spacer 40 has a third portion 40c screwed on the portion 40a. At its end facing the portion 40b the portion 40a is extended by a rod which slides in a hole formed in the adjacent end of the portion 40b.

The automatic adjustment means associated with the extensible spacer 40 comprise a toothed wheel formed on the periphery of the intermediate portion 40c and in engagement with a pawl 40d formed at the end of a resilient blade, whose opposite end is fastened on the portion 40b. A member (not shown) fixed on the portion 40a of the spacer cooperates with the spring blade carrying the pawl 40d, in such a manner that any movement of the portions 40a and 40b of the spacer away from one another, in excess of a determined operating clearance, enables the pawl 40d to rotate said toothed wheel in the direction corresponding to the elongation of the spacer 40.

When the pressure in the brake motor 22 is relaxed, the tension spring 30 pulls back to the position of rest those ends of the shoes which are adjacent to said motor, the minimum distance between these ends being defined by the length of the spacer 40 in its completely screwed-in position.

According to the invention a device is also provided for neutralizing the automatic adjustment means just described when the braking force applied to the shoes by the brake motor 22 exceeds a predetermined threshold.

A first form of construction of said neutralization means, which is illustrated on the left-hand half of FIG. 1, will now be described in greater detail with reference to FIGS. 2a, 2b and 3.

In this first embodiment of the invention a lever 46 is pivotally mounted by a pin 48 on that end of the web 12a of the leading shoe which is adjacent to the brakemotor 22. The geometrical axis of said pin 48 is situated in the same plane as the axis of the brake motor 22 and is directed perpendicularly to said axis.

As illustrated in FIG. 2a, the end of the lever 46 adjacent to the brake motor 22 ends in a protuberance 46a situated entirely on the other side of the plane passing through the geometrical axes of the brake motor 22 and of the pivot pin 48, relative to the spacer 40. A tension spring 50 interposed between the web 12a of the shoe 12 and the opposite end of the lever 46 urges the latter to turn in the clockwise direction, referring to FIG. 2a, thus having the effect of normally holding the lever 46 in a position of rest determined by abutment of the lever 46 against the shoe 12. To this end the lever 46 may have a pressed-out part (not shown) adapted to come to bear against the inside edge of the web 12a of the leading shoe. In this position of rest the protuberance 46a projects beyond that end edge of the web of the shoe 12 which is adjacent to the brake motor 22. The piston 24 therefore bears against the protuberance 46a and is normally spaced apart from the end edge of the web of the shoe 12.

Moreover, in the previously defined position of rest of the lever 46 the latter is in contact with the bottom of the cutout formed in the portion 40a of the spacer 40, whereas the web 12a of the shoe 12 is spaced apart from the bottom of said cutout.

In the arrangement just described above with reference to FIGS. 2a and 3, and in contrast to existing drum brakes of this type, there is therefore no direct contact between the piston 24 of the brake motor and the web of the shoe 12, or between the spacer 40 and the web of the shoe 12.

On operation of the brake motor 22, the lever 46 is subjected to two antagonistic forces, namely the forces applied by the spring 50 urging the lever to turn in the clockwise direction, referring to FIG. 2a, and the force applied by the piston 24 urging the lever 46 to turn in the opposite direction.

In the case illustrated in FIG. 2a, which corresponds to normal braking, the moment of the force exerted by the piston 24 on the protuberance 46a of the lever, about the axis 48, is smaller than the moment of the force exerted by the spring 50 on the opposite end of the lever, about the axis 48. Consequently, the lever remains in its position of rest, that is to say it does not pivot on the web of the shoe 12. In these circumstances the operation of the previously described automatic adjustment device is not neutralized, that is to say the elongation of the spacer 40 is effected as soon as the distance between the ends of the shoe resulting from the operation of the brake motor 22 exceeds the operating clearance permitted by this device.

On the other hand, FIG. 2b illustrates the case of heavy braking leading to the application of an excessive force to those ends of the shoes which are adjacent to the brake motor, thus leading to overadjustment in a brake not equipped with the device according to the invention.

When this situation arises, the moment of the force exerted by the piston 24 on the protuberance 46a of the lever exceeds the moment of the force exerted in the opposite direction by the spring 50 on the opposite end of the lever 46, about the pivot pin 48 of the latter. Consequently, the operation of the brake motor 22 is then accompanied by the pivoting of the lever 46 about its pin 48 in the counterclockwise direction, referring to FIG. 2b. In view of the fact that the lever 46 is in contact with the bottom of the cutout formed in the portion 40a of the spacer 40 through the action of the spring 44, no substantial spacing apart of the two ends of the spacer then occurs, so that the automatic adjustment device is neutralized. Overadjustment of this device is thus avoided.

In the second embodiment of the invention illustrated on the right-hand half of FIG. 1, and shown in greater detail in FIGS. 4a, 4b and 5, instead of using an additional lever 46 mounted on the web of the shoe 12 in compression, use is made of the hand brake lever 34 mounted on the shoe 14 in tension.

More precisely, and as better illustrated in FIGS. 4a and 5, the hand brake lever 34 is then provided at its end adjacent to the brake motor 22 with a protuberance 34a situated entirely on the other side of the plane passing through the geometrical axes of the motor 22 and of the pivot pin 36, relative to the spacer 40.

When the hand brake lever 34 is in its position of rest, the spring 42 applies the bottom of the cutout formed at the end of the portion 40b of the spacer against the inside edge of the hand brake lever. The pressed-out portion 34b (FIG. 1) of the hand brake lever is then applied against the inside edge of the web of the shoe 14. In these circumstances, the protuberance 34a projects towards the piston 26 of the motor 22, beyond the end edge of the web of the shoe 14. Consequently, the piston 26 bears against the protuberance 34a of the hand brake lever through the action of the spring 30 when the brake motor is released, whereas the end edge of the web of the shoe 14 is held away from the piston 26.

Like the lever 46 in the first embodiment, the hand brake lever 34 is thus subjected during operation of the brake motor 22 to two antagonistic forces urging it to turn in opposite directions about its axis 36. More precisely, whereas the force exerted indirectly on the lever 34 by the spring 42, by way of the spacer 40, urges the hand brake lever to turn in the counterclockwise direction about its axis 36, the force exerted on the protuberance 34a of the hand brake lever by the piston 26 of the brake motor 22 urges this lever to turn in the opposite direction.

FIG. 4a shows that in the case of normal operation of the brake the moment of the force exerted by the piston 26 of the brake motor on the protuberance 34a of the hand brake lever about its axis 36 is smaller than the moment of the force exerted on this lever by the spring 42 about the same axis 36. In these circumstances, the hand brake lever 34 remains in its previously defined position of rest, that is to say it does not pivot about its axis 36. Consequently, when the operation of the brake leads to the movement away from one another of those ends of the shoes which are adjacent to the brake motor 22 to an extent greater than the operating clearance determined by the adjustment device associated with the spacer 40, an adjustment of the brake leading to an increase of the length of said spacer is brought about.

On the other hand, in the case of heavy braking, as illustrated in FIG. 4b, which in a brake not equipped with the device according to the invention would lead to overadjustment, the moment of the force exerted by the piston 26 of the brake motor on the protuberance 34a of the hand brake lever, about the axis 36, exceeds the moment applied in the opposite direction by the spring 42. In consequence, the operation of the brake motor 22 is then accompanied by the pivoting of the hand brake lever 34 in the clockwise direction, referring to FIG. 4b. The distance between the inside edge of the hand brake lever 34, which bears against the bottom of the cutout formed in the portion 40b of the spacer 40, and the edge of the shoe web which bears against the bottom of the cutout formed in the portion 40a of the spacer then remains practically unchanged. Consequently, no increase of the length of the spacer 40 is effected and the adjustment device is neutralized.

The invention is obviously not limited to the embodiments described above as examples, but covers all variants thereof.

In particular, the first embodiment described is applicable to a drum brake which may or may not be equipped with a hand brake lever. In the second case, the lever 46 may be mounted indiscriminately on either of the shoes. Moreover, the two embodiments described may be used whatever the nature of the automatic adjustment device enabling the length of the spacer to be controlled.

I claim:

1. A Self-adjusting drum brake comprising a support plate on which are slidably mounted two brake shoes carrying friction members adapted to be brought into contact with a rotating drum by a brake motor interposed between two adjacent ends of the shoes, a spacer of variable length interposed between the shoes in the proximity of the brake motor, automatic adjustment means effecting the elongation of the spacer when operation of the brake moves said ends of the shoes apart to an extent exceeding a predetermined operating clearance, and first resilient means urging the shoes against the spacer, characterized by a first shoe carrying by means of a pivot pin a lever against which the brake motor and the spacer normally bear through the action of said first resilient means, second resilient means bearing against the first shoe to apply to the lever a force tending to hold the lever in abutment against the first shoe, a first moment of the force in relation to the pivot pin of the lever being opposite to a second moment of a force exerted on the lever by the brake motor and determining a limit value of said second moment, beyond which value the operation of the brake motor effects the pivoting of a spacer engaging portion of the lever towards the other shoe, thereby neutralizing the automatic adjustment means.

2. Drum brake according to claim 1, characterized by the fact that the pivot pin of the lever on the first shoe is situated in a plane containing the axis of the brake motor, the motor bearing against a projection formed on the lever and situated on an opposite side of said plane, relative to the spacer.

3. Drum brake according to claim 2, characterized by the fact that the brake motor and the second resilient means bear against opposite ends of the lever, the lever being pivoted on the first shoe in the proximity of the brake motor.

4. Drum brake according to claim 2, characterized by the pivoting lever being a hand brake lever pivoted on the first shoe (14) in the proximity of the brake motor, the second resilient means being interposed between the spacer and the first shoe in order to hold the spacer permanently in abutment against the hand brake lever.

* * * * *